(12) United States Patent
Maryanka

(10) Patent No.: US 7,010,050 B2
(45) Date of Patent: Mar. 7, 2006

(54) SIGNALING OVER NOISY CHANNELS

(75) Inventor: Yair Maryanka, Tel Aviv (IL)

(73) Assignee: Yamar Electronics Ltd., Tel Aviv (IL)

( * ) Notice: Subject to any disclaimer, the term of this patent is extended or adjusted under 35 U.S.C. 154(b) by 721 days.

(21) Appl. No.: 09/941,598

(22) Filed: Aug. 30, 2001

(65) Prior Publication Data

US 2003/0045970 A1    Mar. 6, 2003

(51) Int. Cl.
*H04L 5/12* (2006.01)

(52) U.S. Cl. ............... 375/261; 375/298; 375/326; 375/340; 375/222; 455/43; 455/102

(58) Field of Classification Search ............... 375/141, 375/146, 261, 268, 272, 273, 279, 295, 298, 375/303, 308, 316, 324–326, 329, 340, 220, 375/222, 259; 455/42, 43, 19.1, 102, 108, 455/110

See application file for complete search history.

(56) References Cited

U.S. PATENT DOCUMENTS

| | | | |
|---|---|---|---|
| 5,485,147 A | 1/1996 | Jaffe et al. | |
| 5,488,631 A | 1/1996 | Gold et al. | |
| 5,703,479 A | 12/1997 | Wieczorek et al. | |
| 5,726,976 A | 3/1998 | Thompson et al. | |
| 5,727,025 A | 3/1998 | Maryanka | |
| 5,950,149 A | 9/1999 | Fieramosca et al. | |
| 6,034,988 A | 3/2000 | Vandermey et al. | |
| 6,205,202 B1 | 3/2001 | Yoshida et al. | |
| 6,259,314 B1 * | 7/2001 | Liu et al. | 329/304 |
| 6,393,064 B1 * | 5/2002 | Nagai et al. | 375/259 |

* cited by examiner

*Primary Examiner*—Dac V. Ha
(74) *Attorney, Agent, or Firm*—Mark M. Friedman

(57) ABSTRACT

The present invention relates to a system and method for signaling among a plurality of devices via a communication carrier over a noisy medium such as a power line and particularly relates to an innovative method and system for high speed signaling using an innovative modulating scheme. The scheme is particularly well adapted for signaling over multiple channels and over direct current (DC) power lines. At the transmitter end, a modem modulates data to be transmitted according to a modulation scheme and a signaling shifter modifies the carrier according to a modification scheme. At the receiver end, a modem demodulates the data according to the modulation scheme and a detector detects the signal in accordance with the modification scheme. Signals may be received over multiple channels. A signal is sent over a subset of the channels. Remaining channels can be used for competing signals avoiding interference. The channel chosen for sending a signal may also indicate signal priority. An innovative device is presenting for testing communication over DC power lines with adjustable attributes.

22 Claims, 9 Drawing Sheets

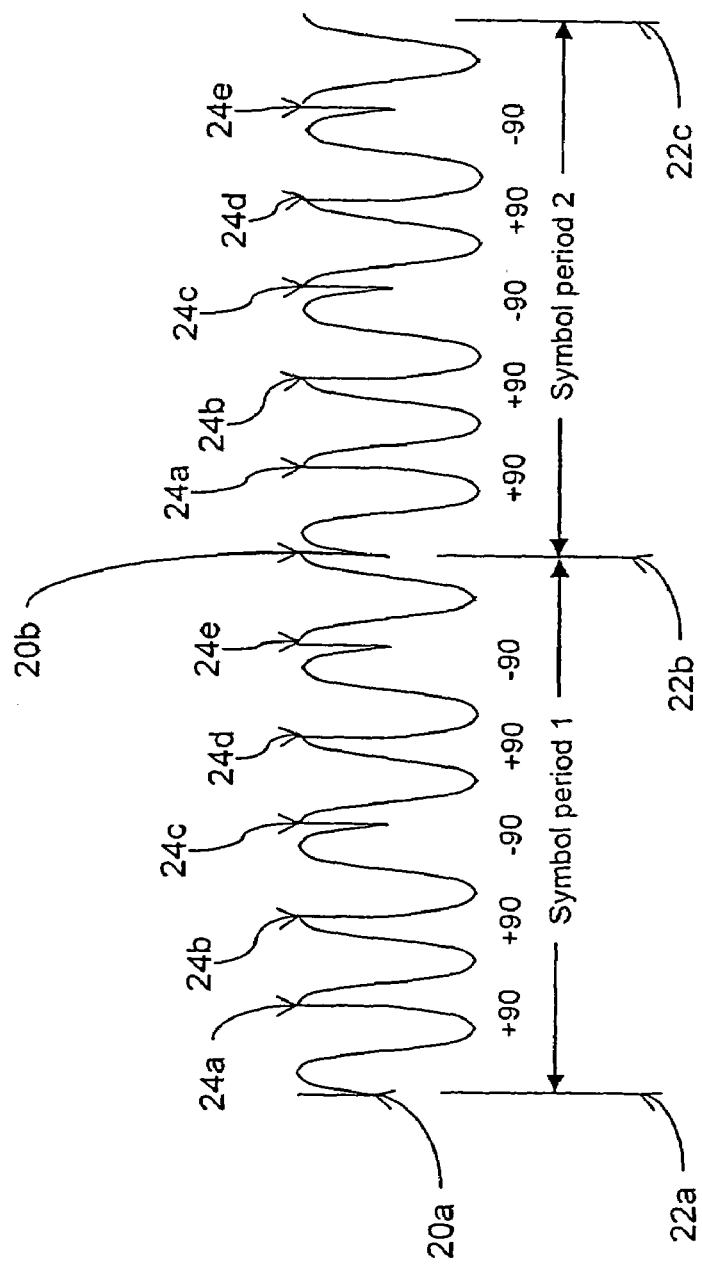

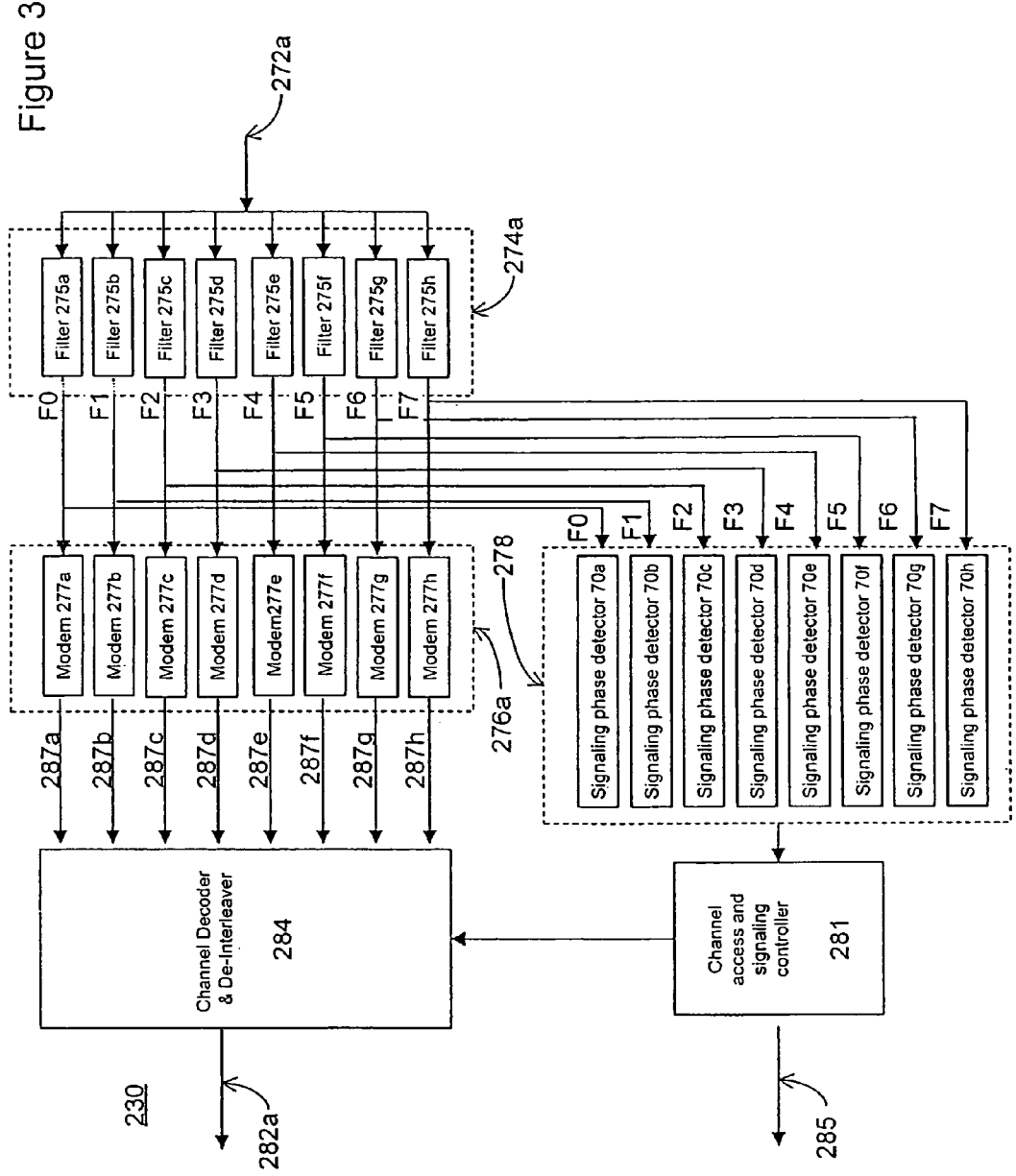

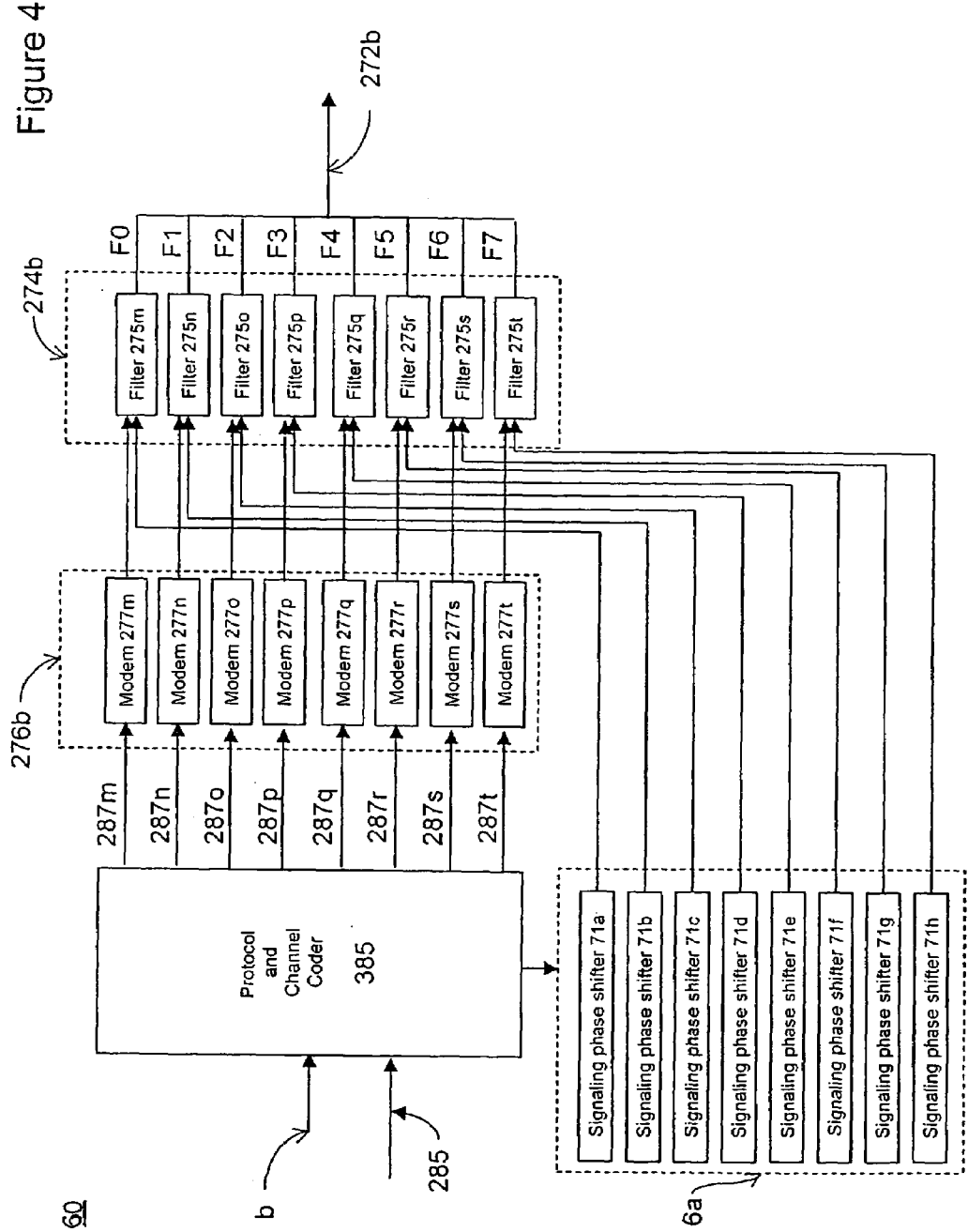

SIGNALING OVER NOISY CHANNELS

FIELD AND BACKGROUND OF THE INVENTION

The present invention relates to a system and method for signaling between a plurality of devices over a noisy power line and particularly relates to innovative method and a system for high speed signals using a distinct modulating scheme over direct current (DC) power lines and multiple frequency channels, and an innovative device to test communication over DC power lines with adjustable conditions.

More and more tasks today require complete or partial computer control. Particularly in transportation, multiple computers, sensors and actuators are an integral part of many machines. Cars, boats, aircraft, and trains use computers to make the engine run efficiently, and to run climate control systems, radios, communication equipment, alarm systems, navigation equipment and on board radar. Traditionally, data were passed between computers, sensors and actuators through dedicated wires and data buses. Large numbers of dedicated communication wires greatly complicates the production and maintenance of vehicles.

Recently there has developed interest in reducing the need for dedicated communication wires by using existing electric power lines as a communication media. Interest has mostly been directed toward using AC power lines to promote communication between appliances, computers and equipment within and between buildings.

Less attention has been directed toward DC power lines, which are used in vehicles. Using DC power lines for communication reduces the space and weight dedicated to communication wiring in vehicles including, for example, automobiles, trains, aircraft and satellites. Reducing the size and weight of vehicles reduces cost of production and increases efficiency and performance.

Maryanka (U.S. Pat. No. 5,727,025) teaches high-speed transmission of data over DC power lines with error control by means of channel coding and modulation. DC power-line communication may be over a single channel or multiple channels as presented in EAEC sixth European ITS conference in Cernobbio Italy on 2–4 Jul. 1997 by Mr. Aldo Romaro et al. "Super Integration In Automotive Electronics" page 1105.

When a plurality of devices communicates over a shared medium such as a DC power line, there is a need to coordinate sharing of the media. Therefore, in order to facilitate communication over noisy media such as DC power lines there must an efficient signaling method. Signaling is used for sending predetermined messages; for example, to turn on or off a particular appliance. Signaling is also used for sending of supervisory information for maintaining communication on a channel. For example: a transmitter uses signaling to instruct a receiver to prepare for a new transmission; a transmitter uses signaling to indicate intention to use a channel in order to prevent other transmitters from interfering with communication on the channel; a receiver uses signaling to inform a transmitter of a reception error; a receiver uses signaling to inform a transmitter of a speed limitation, a receiver uses signaling to inform a transmitter of a congestion condition wherein the receiver cannot receive (for example: due to a full input buffer or due to an incoming message on a separate channel), a receiver uses signaling to send to a transmitter a request to retransmit.

Signaling is commonly used for collision detection and collision resolution (detection of potential interference between transmissions by multiple devices on a channel and coordination of communication to avoid the interference). For efficient collision detection and resolution on a noisy channel, it is necessary to have a signaling method by which competing transmitting devices can quickly signal their intention to use the channel preventing other transmitters from accessing the channel.

DC power lines are considered typically as very noisy communication channels with high level impulse noises, causing communication errors over a wide range of frequencies. In addition, part of the frequencies available for communication may be blocked for long period of time as a result of Electro Magnetic Interference (EMI) or strong attenuation resulting from inter-symbol interference, fading and standing waves. The combination of wide band short-term impulse noise and long time period narrow band interference places stringent demands on signaling. Specifically, the high probability of blocked channels and the large number of communication errors over DC power-lines results in an increased burden of coordination and an increased number of signals. On a noisy channel, signals must be resistant to frequency notch and blocking by noise.

Communication can be for the purpose of transferring arbitrary data or for the purpose of sending one of a predetermined set of messages. Errors cannot be readily detected or corrected in arbitrary data. Therefore, arbitrary data is generally transmitted via symbol codes that have high resistance to random errors. Resistance to errors in symbol codes is achieved by lengthening the symbol transmission period. Lengthening the symbol transmission period slows communication.

Signaling is used for sending a message taken from a predetermined limited set of potential messages. A predetermined finite domain of signals corresponds to the predetermined finite set of messages. When a signal is corrupted, the corrupted signal will seldom correspond to a signal in the domain of potential signals. Therefore, an error is easily recognized. When there is an error, the original intended signal can be retrieved by finding the legitimate signal most similar to the received signal. Thus, signals are inherently resistant to changing the meaning (aliasing). Therefore, the use in signaling of lengthened symbol codes developed for arbitrary data communication implies redundant error protection. Redundant error protection is inefficient and unnecessarily slows signaling.

VanderMey et al. (U.S. Pat. No. 6,034,988) teach a spread spectrum apparatus and method for network RF data communications having extended communication channels. The spectrum spreading method of VanderMey '988 is frequency hopping across a plurality of channels. Frequency hopping allows communication over noisy media. In order to permit simultaneous data hopping and carrier sensing multiple access—collision detection (CSMA-CD) VanderMey '988 requires a means of fast signaling of a free channel. According to VanderMey '988 fast signaling is to be achieved by a RF signal within one sub-symbol of a data packet. However, nowhere does VanderMey '988 disclose a one sub-symbol signaling method. VanderMey does reveal a signaling method by a code of multiple symbols. Because each frequency hop must wait until a signal can be detected on a new channel, signal detection by a code of multiple symbols significantly slows communication in the VanderMey '988 method.

Jaffe et al. (U.S. Pat. No. 5,485,147) teach a method and apparatus for scheduling access to a CSMA communication medium. According to the method of Jaffe et al. '147 signaling is over a dedicated channel that is not available for arbitrary data communication. The additional channel increases network cost because the additional channel requires extra hardware for each component of the network and requires extra bandwidth.

Gold et al. (U.S. Pat. No. 5,488,631) teach a wireless direct-sequence spread spectrum TDMA communications system. The patent of Gold et al. '631 discloses a physical layer method for communication including signaling. The signaling method of Gold et al. '631 is direct sequence spread spectrum communication (DSSS). DSSS was developed for arbitrary data communication. As such DSSS does not take advantage of the limited domain of signals. Thus signaling requests according to Gold et al. '631 require more communication resources than optimized signaling. Furthermore, DSSS requires the generation of complex pseudo-noise functions and modulation and demodulation of signals by means of the pseudo-noise functions. Generation and modulation with pseudo-noise functions increases the complication and expense of each transmitter and receiver on the network of Gold et al. '631. The system of Gold et al. '631 is well suited for a DSSS network wherein transmitters and receivers are necessarily equipped with pseudo-random code generators and modulators and wherein messages are long. But in a network where messages are short and devices are relatively simple, the method of Gold et al. '631 requires dedication of an unnecessarily large quantity of resources to CSMA-CD and signaling.

Thompson (U.S. Pat. No. 5,726,976) teaches a congestion sense controlled access for a star configured network. According to Thompson '976 the communication rate can be increased over a carrier sense network (with emphasis on Ethernet networks) by reduction of the packet length. Thompson '976 further reveals a method for duplex communication over star configured network. In order to achieve full duplex, Thompson '976 requires in-band signaling. While one goal of Thompson '976 is to reduce the communication packet length the revealed method of in-band signaling requires block encoding including extra signaling bits in the transmitted data. Block encoding increases the packet length and decreases communication efficiency.

Communication devices are often required to function under a variety of conditions. For example a particular set of devices may be used in different vehicles and under different operating conditions. When developing or trouble shooting a communication device it is unfeasible and prohibitively expensive to install and test a device in every possible configuration and under all possible conditions. Therefore testing is done using a testing apparatus.

Prior art systems for testing a communication device require installation into a particular environment or do not allow for varying the testing conditions without permanent modification of the testing apparatus. For example, Wieczorek, et al. (U.S. Pat. No. 5,703,479) reveal a system for loopback testing of electronic equipment. But the method of Wieczorek et al. '479 makes no allowance for changing conditions under which the equipment operates. Fieramosca, et al. (U.S. Pat. No. 5,950,149) reveal a "Method for testing vehicle electrical system during manufacturing". The method of Fieramosca et al. '149 requires testing the electrical system after installation in a car and cannot make account for individual differences between cars or changes in conditions (for example, as a car ages). Yoshida, et al. (U.S. Pat. No. 6,205,202) reveal a method of testing home communications lines. Yoshida '202 fails to consider the importance of differing performance under particular environmental conditions.

There is thus a widely recognized need for, and it would be highly advantageous to have a signaling system and method to allow fast signaling and CSMA-CR over noisy communication circuits. Further, there is a widely recognized need for, and it would be highly desirable to have a device to facilitate testing of communication installed in different pieces of equipment or functioning under varying environmental conditions.

Definitions

For the sake of the present patent the following definitions will be used:

a collision is an intent of a plurality of transmitters to transmit during a particular common time period on a specific channel;

a collision resolution is a decision not to transmit during the particular time period on the specific channel in all but one transmitter involved in a collision.

a channel is a defined part of communication carrier through which a limited quantity of information is transmitted; for example, a channel may include a frequency band from a frequency range in a radio signal or in an optical signal, and a wire from a group of wires;

a communication carrier is a vehicle by which a message may be sent; electromagnetic waves, sound or ultra-sonic vibrations are common examples of communication carriers;

a communication medium is a physical vessel for conveying a communication carrier; examples of media include but are not limited to a wire, an electromagnetic field, a conduit, and an optical fiber;

a device is a member of communication network that may include components to serve any function and is configured to send a signal, receive a signal or both transmit and receive a signal.

SUMMARY OF THE INVENTION

The present invention is a system and method for signaling among a plurality of devices over a noisy medium and particularly relates to innovative method and system for high-speed signals using a distinct modulating scheme over direct current (DC) power lines and multiple frequency channels. The invention further reveals an innovative device to test communication over DC power lines with adjustable conditions.

According to the teachings of the present invention there is provided a method of transmitting an arbitrary datum over a channel and for sending a signal over the channel. The method includes the steps of modulating the arbitrary datum onto a carrier by a modulation scheme for transmitting the arbitrary datum and modifying the carrier by a modification scheme for sending the signal.

According to further features in preferred embodiments of the invention described below the modulation scheme includes transmitting a plurality of consecutive symbols at a symbol rate and the modification scheme includes modifying said carrier at a modification rate, the modification rate being higher or lower than the symbol rate.

According to further features in preferred embodiments of the invention described below the modulation or the modification may be effected by binary phase shift keying (BPSK), quadrature phase shift keying (QPSK), amplitude modulation (AM), frequency modulation (FM), or code division multiple access (CDMA).

According to still further features in preferred embodiments of the invention described below the signal is used to communicate a message that includes but is not limited to an intention to transmit, an end of transmission, a congestion condition (for example a full receive buffer or a receiver speed limitation), an instruction to turn on a device, and instruction to turn off a device, a request to retransmit, a dominant status and a recessive status.

According to still further features in preferred embodiments of the invention described below the carrier is conveyed over a medium. The medium may include but is not limited to a utility power line, a DC power line, a dedicated communication wire, a fiber optic cable, and a magnetic field.

According to still further features in preferred embodiments of the invention described below the modulating and the modifying are effected substantially simultaneously.

According to still further features in preferred embodiments of the invention described below the pattern of modifications is used to estimate the channel probability of errors and to adjust the usage of a channel according to that estimated probability of communication errors.

According to another embodiment of the present invention there is provided, a receiver for receiving an arbitrary datum from a channel of a communication carrier and for receiving a signal over the channel. The receiver includes a modem for demodulating the arbitrary datum and a detector to detect the signal. The datum is modulated by a modulation scheme and the signal is sent via modifications of the carrier according to a modification scheme.

According to further features in preferred embodiments of the invention described below the modification scheme includes a pattern of modifications to the carrier. In order to identify the pattern, the receiver includes a processor.

According to still further features in preferred embodiments of the invention described below the modulation scheme includes modulating a symbol onto the carrier over a symbol period and the pattern includes a plurality of modifications within the symbol period.

According to still further features in preferred embodiments of the invention described below the processor includes consisting of but is not limited to a programmable logic array device, an application specific integrated circuit, or a digital signal processor.

According to still further features in preferred embodiments of the invention described below the modulation scheme includes modulating a plurality of symbols onto the carrier at a symbol rate and the pattern includes a plurality of modifications. The modifications are superimposed onto the carrier at a modification rate. The modification rate may be higher or lower than said symbol rate.

According to still further features in preferred embodiments of the invention described below a pattern identification criterion is adjusted according to communication performance.

According to still further features in preferred embodiments of the invention described below the processor further adjusts a usage of a channel for an arbitrary datum transmission according to communication performance.

According to yet another embodiment of the present invention there is provided a transmitter. The transmitter is for transmitting an arbitrary datum over a channel of a communication carrier and for sending a signal over the channel. The transmitter includes a modem for modulating the arbitrary datum according to a modulation scheme, and a signaling shifter to modify the communication carrier according to a modification scheme.

According to still further features in preferred embodiments of the invention described below the modification scheme includes a pattern of modifications. In order to produce the pattern, the transmitter further includes a signaling pattern generator for controlling the shifter.

According to still further features in preferred embodiments of the invention described below the modulation scheme includes modulating a symbol onto the carrier over a symbol period and the signaling pattern includes a plurality of modifications. The pattern is transmitted within the symbol period.

According to still further features in preferred embodiments of the invention described below the modulation scheme includes modulating a plurality of symbols onto the carrier at a symbol rate and the modification scheme includes a plurality of modifications at a modification rate. The modification rate may be higher or lower than the symbol rate.

According to still further features in preferred embodiments of the invention described below the signaling pattern generator includes a processor. The processor may include but is not limited to a programmable logic array device, an application specific integrated circuit, and a digital signal processor.

According to still further features in preferred embodiments of the invention described below the signaling pattern is altered to adjust the usage of a channel according to communication performance.

According to yet another embodiment of the present invention there is provided a method of signaling during communication by a plurality of devices over a plurality of channels. The method includes the steps of a first devices sending a first signal on a first channel and a second device listening for the signal over a subset of the channels. The subset of channels includes the first channel and a second channel.

According to still further features in preferred embodiments of the invention described below the signaling method further includes the step of the first device detecting a second signal over the second channel.

According to still further features in preferred embodiments of the invention described below the second device includes a transmitter. The second device listens for a signal for the sake of collision detection or collision resolution. The transmitter of the second device transmits according to arbitration of the signal resolution.

According to still further features in preferred embodiments of the invention described below the first signal is communicating an intention to transmit over some or all of the channels.

According to still further features in preferred embodiments of the invention described below the method of signaling for collisions resolution further includes the step of assigning a signal priority level to the first signal. Resolution of conflicts is according to the signal priority level.

According to still further features in preferred embodiments of the invention described below a channel of the subset of channels used for signaling is associated with a channel priority level. The signal priority level is assigned according to the channel priority of the channel over which the signal is sent.

According to yet another embodiment of the present invention there is provided a method for signaling during communication by a plurality of transmitters over a plurality of channels. The method includes the steps of sending a first signal from one of the transmitters on at least one channel and listening by the transmitter for a second signal from a second transmitter over a second channel.

According to yet another embodiment of the present invention there is provided a system for testing communication amongst a plurality of devices over a medium. The system comprises an adjuster to change an attribute of the medium and a DC power supply for supplying a DC voltage to the devices. The DC power supply is decoupled from transmissions from the devices by an inductor.

According to still further features in preferred embodiments of the invention described below the attribute of the medium changed by the adjuster includes but is not limited to attenuation, impedance, frequency response, noise pattern, or noise level.

According to yet another embodiment of the present invention there is provided a method for testing communication between two devices via a medium. The method comprises the steps of connecting the devices to the medium, adjusting an attribute of the medium, conveying a message over the medium from a first device to a second device, determining whether the message is received by the second device; and imposing a DC voltage on at least one of the devices.

The present invention successfully addresses the shortcomings of the presently known configurations by providing a method and system for fast signaling. Signals may be sent at a rate higher than a symbol rate. Fast signaling makes communication between multiple devices more efficient. Fast, reliable signaling is particularly increases efficiency of communication over a noisy medium such as a DC power line. The current invention also discloses a novel system and method for testing communication over a DC power line. The system and method for testing communication saves money developing and testing communication devices by enabling testing of communication under varied working conditions without requiring installation of communication devices in different vehicles.

BRIEF DESCRIPTION OF THE DRAWINGS

The invention is herein described, by way of example only, with reference to the accompanying drawings, wherein:

FIG. 1 is a schematic illustration of a modified wave used for signaling according to the present invention;

FIG. 3 is a schematic drawing of an embodiment of a multi-channel receiver with signaling according to the present invention;

FIG. 4 is a schematic drawing of an embodiment of a multi-channel transmitter with signaling according to the present invention;

DESCRIPTION OF THE PREFERRED EMBODIMENTS

Figure 2A:
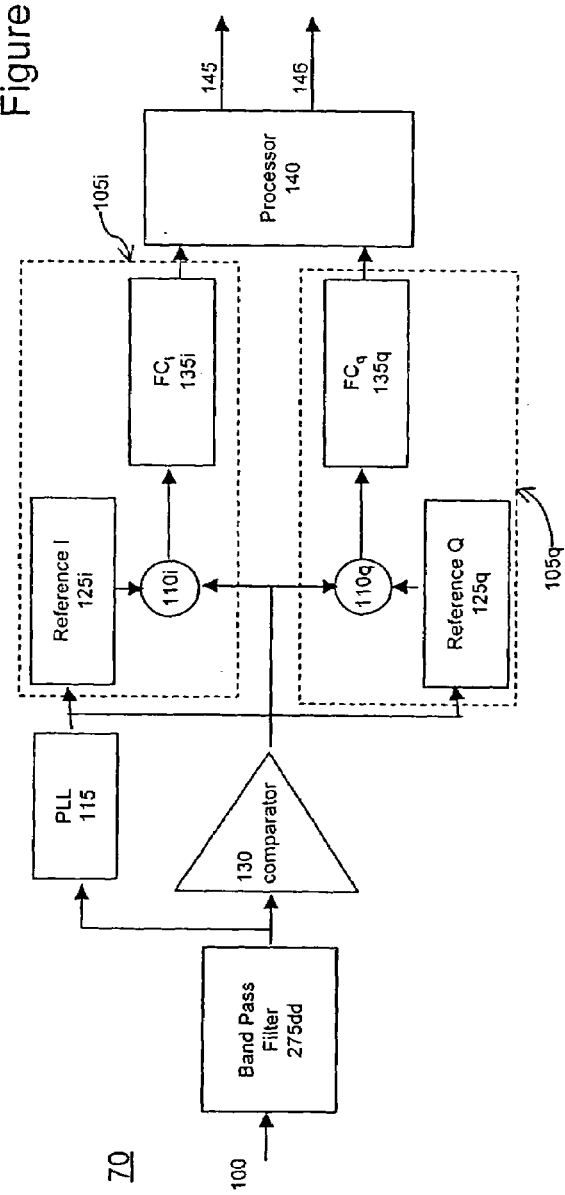
FIG. 2a is a schematic drawing of an embodiment of signaling phase detector according to the present invention.

The present invention relates to a method for signaling among a plurality of devices over a noisy media and particularly relates to an innovative method and system for signaling over DC power lines and an innovative device to test signaling and communication over DC power lines amongst a plurality of devices under varied conditions.

The principles and operation of method and a system for signaling over noisy media such as DC power lines according to the present invention may be better understood with reference to the drawings and the accompanying description.

FIG. 1 illustrates a signaling waveform according to the current invention. For illustrative purposes the waveform is shown repeated twice. The medium in FIG. 1 is a DC power line. The carrier in FIG. 1 is a RF wave. The signaling channel is a frequency band. The frequency band is primarily used for arbitrary data communication. The arbitrary data communication modulation scheme in FIG. 1 is BPSK at a symbol rate of 636 kHz. In BPSK modulation, symbols are communicated by 90 degree phase shifts $20a$ and $20b$ at the beginning $22a$, $22b$ of each symbol period. For example, the symbols are bits and the symbol period is $\frac{1}{636,000}$ sec. In FIG. 1, are shown two consecutive symbols. In the embodiment of FIG. 1, the symbol period for arbitrary data communication, is six cycles of the carrier wave. Phase shifts for arbitrary communication are always at the beginning of a symbol period and never within the symbol period. In order that the symbol period include six cycles of the carrier wave at a symbol rate of 636 kHz, the carrier frequency is 3.8 MHz. Other common modulation schemes include but are not limited to QPSK, FM, AM, CDMA and combination of the above modulation schemes such as frequency key shifting for arbitrary datum and amplitude modulation for signaling.

Random noise on the channel causes random phase shifts of the carrier wave. A data error occurs when noise causes a consistent shift over most of the symbol period. Random noise is unlikely to consistently affect the phase of the wave over many cycles. Therefore, as the symbol period increases, the likelihood of errors from random noise decreases.

In the embodiment of FIG. 1, fast signaling is achieved by modifying the carrier with a scheme of multiple phase shifts within a single pattern period. There is at least one full cycle of the carrier wave between any two phase shifts to allow differentiation between Sine and Cosine waves. In a real network, signals and arbitrary communication symbols are not generally transmitted simultaneously. Nevertheless, for the sake of illustration, FIG. 1 includes phase shifts $24a$–$24e$ for signaling. Phase shifts for signaling may also occur at the beginning of a symbol period, for example phase shifts $20a$–$20b$. Specifically one symbol period in FIG. 1 contains six phase shifts for signaling $24a$, $24b$, $24c$, $24d$, $24e$ and $20b$. Thus the modification rate is 6×636=3.8 MHz. Phase shifts $24a$–$24e$ and $20b$, within one symbol period are +90, +90, −90, +90, −90 and −90 degrees. Thus, in arbitrary data communication when using BPSK modulation, only one binary bit can be transmitted in a single a symbol period. Whereas in signaling, one of up to $2^6$ predetermined signals can be transmitted in a pattern period. In FIG. 1, the signaling pattern period and the arbitrary data symbol period are the same length. In an alternative embodiment, the signaling period could be longer or shorter than the arbitrary data symbol period. In FIG. 1, the pattern rate is equal to the carrier frequency. The pattern rate may be less than the carrier frequency. In actuality, the number of predetermined potential signals is much less than $2^6$ therefore only a few patterns are legitimate signals. The small ratio of legitimate signaling patterns to possible patterns allows distinction between noise and intended signaling patterns. Multiple-phase shifts in a short period increase the likelihood that a receiver will not detect all of the phase shifts. Therefore in the embodiment of FIG. 1, when a receiver receives a pattern, which may not be an exact replica of the transmitted signal, the receiver must decide if the pattern resembles a known signal. For example, the criterion for identification of the signal of FIG. 1 is detecting five of the six phase shifts of the pattern of FIG. 1.

Other possible modification schemes include but are not limited to amplitude shifting or frequency shifting. For example, multiple amplitude shifts may be made in a symbol period and amplitude shifts may be by a factor of 0, −1, or ½.

A modification of a carrier for the sake of signaling according to the present invention is not limited to changing the phase of an electrical wave. The carrier of a signal may be light for example in a fiber optic cable. Similarly the communication medium may be an air conduit and the communication carrier may be sound waves. Methods used to modulate the carrier may include frequency modulation and amplitude modulation. Further examples of modifications include frequency shifting for example a FM chirp or modification of chirps.

FIG. 2a is an example of a signaling phase detector 70 for detecting phase modifications in a carrier of a signal 100. Signal 100 consists of phase shifts similar to the signaling waveform in FIG. 1. A digital logic circuit contains two detector arrays 105$i$ and 105$q$. Detector arrays 105$i$ and 105$q$ contain generators of a reference signal I 125$i$ and a reference signal Q 125$q$ respectively. Reference signal Q is shifted by 90 degrees from reference signal I. Both reference signals Q and I have the same frequency corresponding to a transmitter carrier wave. Both reference signals Q and I are synchronized to received signal 100 by means of a Phase Lock Loop 115. Received carrier signal 100 passes through a band pass filter 275$dd$. The central frequency of filter 275$dd$ is the base frequency of the transmitter carrier wave of signal 100. Signal 100 is converted by a comparator 130 into digital form and compared with reference signals I and Q. Detector arrays, 105$i$ and 105$q$ further each contain a fast counter $FC_I$ 135$i$ and $FC_Q$ 135$q$ respectively. A phase difference between received signal 100 and reference signals I and Q is measured by means of fast counters $FC_I$ 135$i$ and $FC_Q$ 135$q$. A processor 140 compares expected phase values to measured phase values of the carrier wave of signal 100. If the difference is less than a preset threshold, the decision logic outputs a "signaling detected" response 145 as required according to signal 100. Based on differences between expected phase shifts and detected phase shifts, processor 140 evaluates communication performance. For example, processor 140 provides an estimated channel bit error rate to output 146. Processor 140, detector arrays 105I and 105$q$, and PLL 115 may include but are not limited to a programmable logic array device, an application specific integrated circuit and/or a digital signal processor. Different types of decision logic processors 140 can be implemented for more sophisticated soft decisions. The band pass filter 275$dd$ can be implemented as discrete LC filter or as a digital filter.

Processor 140 evaluates communication performance based on the difference between a received signaling pattern and an expected pattern. Estimation of communication performance may be made periodically using a known calibration pattern, or estimation of communication performance may be made "on line" based on received signals.

For example, for the pattern of FIG. 1, processor 140 tracks the number of signals wherein all six phase shifts are detected and the number of signals wherein only five of the six phase shifts are detected. When the ratio of signals with six detected shifts to signals with five detected shifts is less than 100:1, then it is assumed that some signals with four detectable shifts are being lost. Therefore, processor 140 adjusts the usage of the channel. Alternatively, along with identifying significant signals wherein five or six of phase shifts from amongst 20$a$ and 20$b$ and 24$a$–24$e$ are detected, processor 140 also tracks possibly missed messages wherein four phase shifts from amongst 20$a$ and 20$b$ and 24$a$–24$e$ are detected. When the ratio of significant signals to possibly missed messages is less than 1000:1, then it is assumed that some signals with four detectable shifts are being lost. Therefore, processor 140 adjusts the usage of a channel both for arbitrary datum and signaling.

Strategies to adjust the usage of a channel include but are not limited to change a pattern length, change a pattern identification criterion and cease use of a channel for communication. By altering a signaling pattern length or a criterion for pattern identification, the probability of signaling errors (false negative or false positive) can be adjusted according to channel noise.

Methods by which processor 140 adjusts a usage of a channel for an arbitrary datum transmission according to communication performance include but not limited to changing a symbol rate and changing an error protection ECC algorithm. In order to change an ECC algorithm, processor 140 sends a signal to a transmitter, instructing the transmitter to change ECC. The transmitter automatically informs intended receivers of the chosen ECC. For example, when the communication error rate is high, processor 140 sends a signal to a transmitter to change to a longer ECC that can correct a higher proportion of errors.

For example in the embodiment of FIG. 1, when a large number signals are being lost (false negative), processor 140 decides to change the pattern identification criterion by reducing the required number of detected phase shifts for identifying a signal. Specifically, the number of phase shifts required to identify the signal is reduced from five of the six to four of the six.

There is a possibility that noise will produce a short-term phase shift similar to signaling phase shift 24$a$ or 24$b$ or 24$c$ or 24$d$ or 24$e$ or 20$b$. Nevertheless, the probability is low that noise will produce five tuned phase shifts that would be identified as the pattern of FIG. 1 (false positive identification error). Reducing the number of phase shift detections required for identifying a signal increases the probability of a false positive identification.

Changing the length of a pattern can help decrease both false negative errors (lost signals) and false positive errors. Increasing the number of phase shifts required to identify a pattern reduces the probability of a false positive identification. Decreasing the portion of signal phase shifts required to be detected for signal identification reduces the probability of false negative errors. Thus, when there are serious consequences to false positive identification error and when the channel is noisy, processor 140 increases the number of phase shifts in the signal from six to eight and increases the number of detected phases shifts required for identification of the signal from five to six. In order that the new signaling pattern of eight phase shifts have one cycle of the carrier wave for each phase shift, the signal period in FIG. 1 is increased to eight cycles of the carrier frequency. Thus, increasing the pattern length decreases the probability of signaling error but slows signaling. In order to implement a change in signal pattern length, processor 140 must inform other devices on the network of the change in signaling pattern. A decision to change a criterion for identifying a pattern may be made by processor 140 as described above. Alternatively, a decision to change a criterion for identification of a pattern may be made externally. For example, based on the detected error rate, a human operator may decide implement a new signal identification criterion. The decision of the operator may be based on the evaluation of communication performance provided in output 146 or the decision of the operator may be based on other data available to the operator. Alternatively, another device on the network may decide to change the identification criterion and the other device then signals detector 70 instructing processor 140 to implement the change.

When the consequence of signaling error is particularly dire and noise on a channel is particularly high, processor 140 decides to stop using the channel for arbitrary datum and signaling. Other transmitters and receivers of the network are instructed to cease use of the channel and direct the arbitrary datum to other channel.

Although the present invention is intended primarily for use with Direct Current (DC) power lines, this signaling method is suitable for a variety of noisy communication media. Examples of other communication media for which this signaling method is suitable include but are not limited to alternating current (AC) utility power lines, radio transmissions including microwave and satellite transmissions, and communication over dedicated wires such as internal wiring in a car or communication cables including phone lines.

Figure 2B:
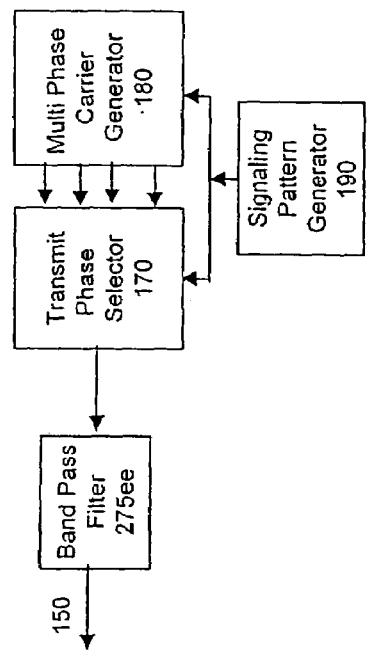
FIG. 2b is a schematic drawing of an embodiment of a signaling phase shifter according to the present invention.

FIG. 2b illustrates a signaling phase shifter 71. A multi phase carrier generator 180 generates a base carrier wave. Phase shifts are added to the base carrier wave by a transmit phase selector 170. The phase and frequency of the base carrier wave and the pattern of phase shifts are both controlled by a signaling pattern generator 190. Signaling pattern generator 190 controls carrier generator 180 and phase selector 170. The output signal of phase selector 170 is tuned by a band pass filter 275*ee* and conducted to the communication medium, in this case a DC power line 150. For example, signaling shifter 71 may be a field programmable gate array (FPGA).

FIG. 3 is a schematic view of a multi-channel data and signaling receiver 230. Receiver 230 receives modulated information 272*a* conveyed over a DC power line. Modulated information 272*a* is divided into eight channels F0–7 (each channel being a frequency band) by an array 274*a* of eight band pass filters 275*a*–275*h*. For example, output of filter 275*a* is channel F0. The waveform of channel F0 is output to a signaling phase detector 70*a* and to a communication modem 277*a*. A detailed schematic drawing of signaling phase detector 70 is shown in FIG. 2a. Waveforms of channels F0–7 are selected by filters 275*a*–275*h* respectively. Outputs of filters 275*a*–275*h* are passed to modems 277*a*–277*h* of modem array 276*a* respectively and to signaling phase detectors 70*a*–70*h* respectively of signaling phase detectors module 278 and channel access signaling controller module 281.

Phase detector 70*a* demodulates signals contained in channel F0. Phase detector 70*a* detects a modification in channel F0, the modification being a phase shift. Similarly signals in channels F1–7 are demodulated by phase detectors 70*b*–70*h* respectively. Output from signaling phase detectors 70*a*–70*h* is output to channel access and signaling detection controller 281. Controller 281 controls a decoder and multiplexed de-interleaver 284. Controller 281 may also send a message 285 to a transmitter 350 (FIG. 3) instructing transmitter 350 to transmit or wait depending on the status of a communication channel. There are different types of signals. Signal types include but are not limited to a start receiving signal, an arbitration signal for example an intention to transmit signal or an end of transmission signal, a retransmit signal (sent by a receiver for example when an error is detected in a data transmission), a congestion condition signal (for example sent by a receive when a receiving buffer is full or sent by a receiver to which are directed multiple transmissions). When the channel bit rate is high, i.e. above 1 Mbps, equalization circuitry may be required to overcome the DC power line inter-symbol interference effects.

Arbitrary data contained in modulated information 272*a* is demodulated into eight separate demodulated bit streams 287*a*–287*h* by modem array 276*a*. Bit streams 287*a*–287*h* are combined (de-interleaved) rearranged (de-multiplexed) and corrected from line errors (decoded with an error correction code) into the message data stream 282*a* by a decoder and multiplexed de-interleaver 284.

Filter array 274*a* is implemented as a discrete LC network, where each filter is centered to a particular frequency band. Each particular frequency band is the physical channel. Alternatively, filters array 274*a* is implemented by digital signal processing.

FIG. 4 illustrates a first embodiment of a multi-channel signal and data transmitter 350 according to the current invention. A data stream 282*b* enters a channel coder and multiplexing interleaver 385 where data stream 282*b* is protected by an error correction code and converted into a bit stream of sub-words. The bit stream is directed as eight bit sub-streams 287*m*–287*t* to eight different channels F0–7. The bit sub-streams 287*m*–287*t* are directed to a modem array 276*b* including eight modems 277*m*–277*t*. An individual bit sub-stream 287 is modulated by a corresponding modem 277 via a corresponding band pass filter 275 onto a corresponding channel. For example, bit sub-stream 287*m* is modulated by modem 277*m* via band pass filter 275*m* onto channel F0. Each modem 277*m*–277*t* operates at a different carrier frequency with a corresponding band pass filter 275*m*–275*t* of filter array 274*b*. The combined outputs of all the filters are transmitted (conducted) as modulated information 272*b* into a DC power line. The power line conveys (conducts) the carrier to a receiver such as receiver 230 of FIG. 3.

When required (e.g. automatically by receiver error decoder 284 or for channel arbitration process of collision detection and resolution before starting transmission), transmitter 350 sends signals using a signaling and channel access module 386*a* of eight signal shifters 71*a*–71*h*. Each signaling shifter modulates a signal onto a corresponding channel. For example, signaling shifter 71*a* modulates a signal onto channel F0. The details of signaling shifter 71*a* are shown in FIG. 2b.

Figure 5:
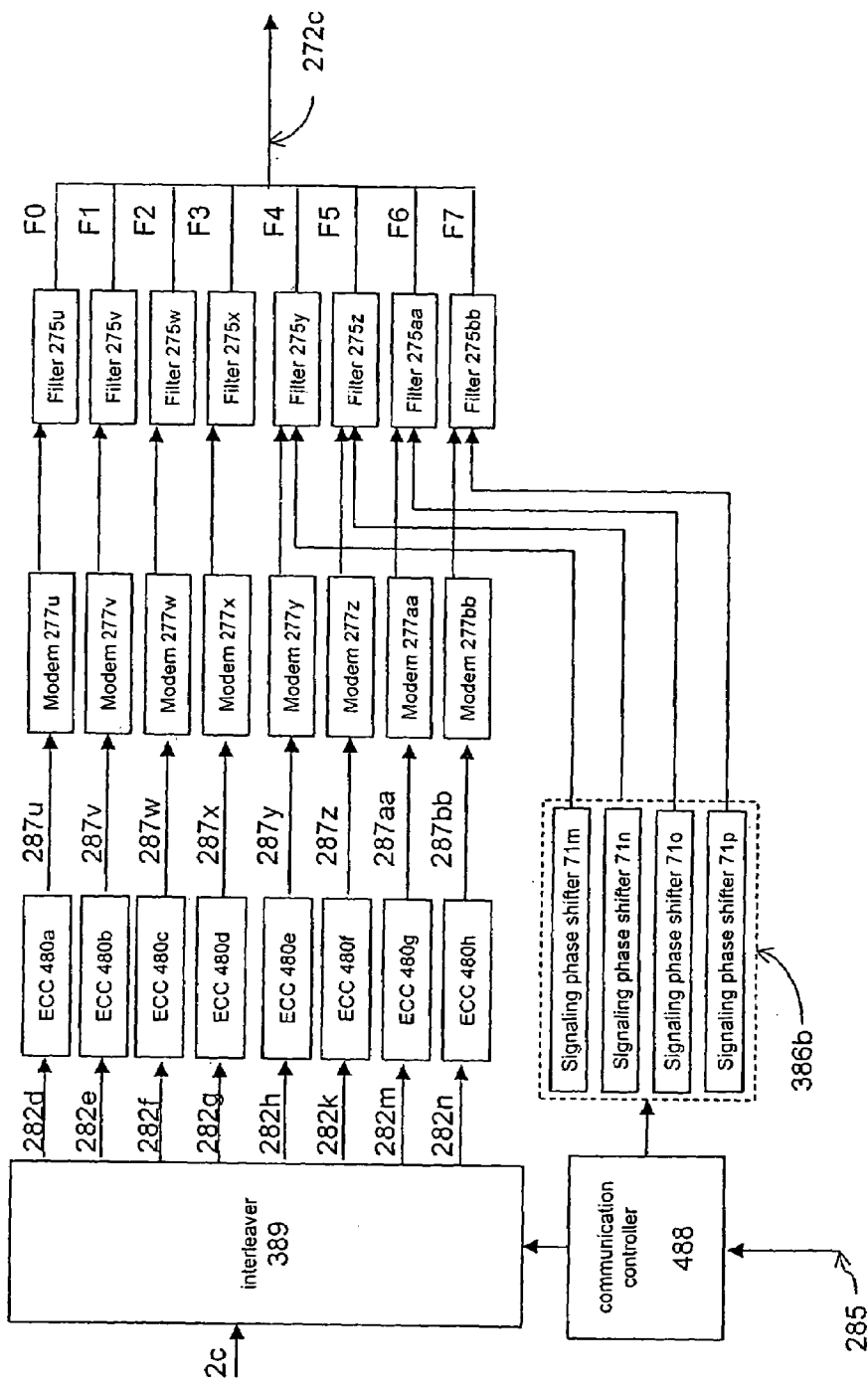
FIG. 5 is a schematic drawing of an alternative embodiment of a multi-channel transmitter according to the current invention.

FIG. 5 illustrates an alternative embodiment 460 of a transmitter according to the current invention. A data stream 282*c* enters an interleaver 389 where the stream is divided into eight data sub-streams 282*d*–282*n* each data sub-stream being directed to a corresponding channel. For each channel there is a corresponding data error correction coder (ECC) 480*a*–480*h*. For example data sub-stream 282*d* is converted into sub-words and protected with an error correction code by ECC 480*a*. Each ECC 480 outputs a respective bit sub-stream 287. For example, ECC 480*a* outputs bit stream 287*u*. Each bit sub-stream is modulated by a corresponding modem 277*u*–277*bb*. Each modem 277*u*–277*bb* operates at a different carrier frequency with a corresponding band pass filter 275*u*–275*bb*. The combined outputs of all the filters are transmitted (conducted) as modulated information 272c into a DC power line to be conveyed to a receiver 230.

When required, transmitter 460 sends signals on a subset F4–F7 of channels F0–7 by means of four phase shifters 71m–71p in a signaling and channel access module 386b. It is apparent that a transmitter or receiver may transmit signals on any number of channels. For example a network may use eight channels for transmitting data and use only a subset of one or two of the eight channels for signals. Alternatively, in a network, eight channels may be used for transmitting data, and all eight channels may be used for signaling. A particular transmitter may send a signal on one channel, all of the available channels or any subset of the available channels.

Figure 6:
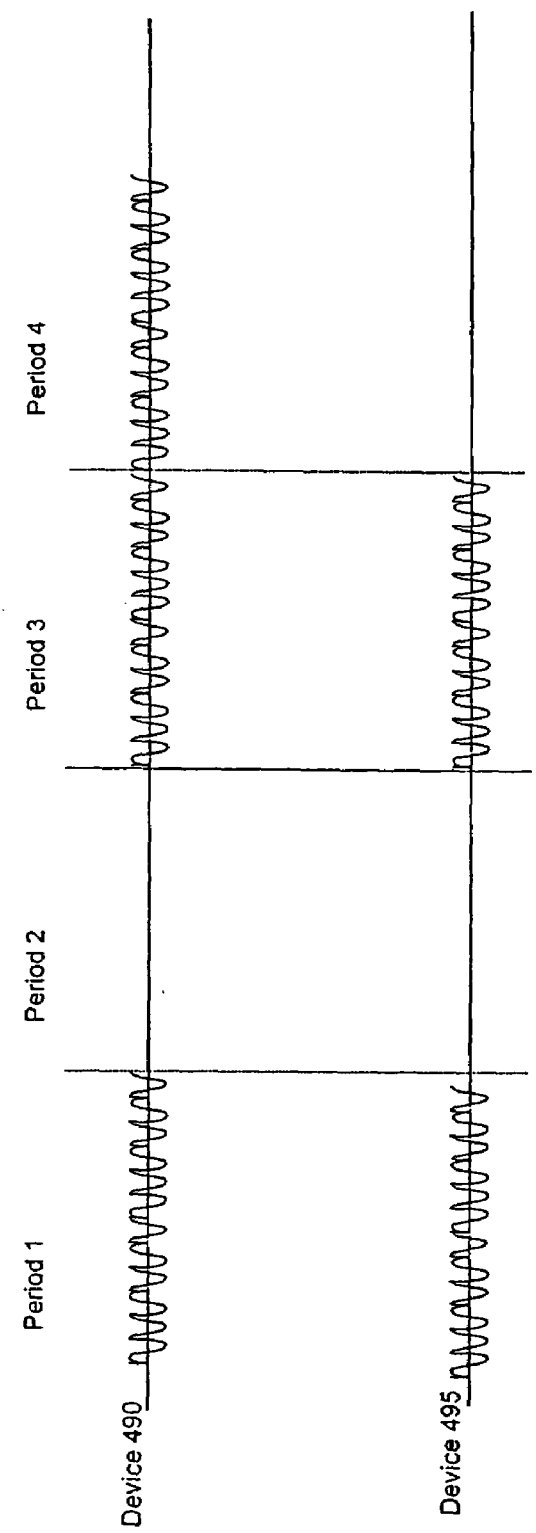
FIG. 6 is a schematic illustration of a collision resolution on a single channel according to the current invention.

FIG. 6 illustrates the use of the signaling pattern of FIG. 1 in arbitration for channel access by means of collision detection and resolution over a single channel. In FIG. 6 two devices labeled device 490 and device 495 are communicating over a shared channel. Each device 490 and 495 includes a transmitter (for example transmitter 460 except that in FIG. 6, signaling is only on one channel) and associated receiver (for example receiver 230). A mechanism for collision resolution (arbitration) is required. Each Device 490 and 495 starts a data transmission with a random or unique combination of signaling send and receive periods. If, during a receive period of device 495, device 495 detects an intent to transmit signal from device 490 then device 495 loses the arbitration and device 495 postpones transmission while receiving a message from device 490. During the arbitration transmit periods, the transmission signals contain a predetermined combination of phases as illustrated in FIG. 1 for best signaling detection on a noisy channel.

The arbitration receive/send combination is determined either on priority basis, or randomly. In the example of FIG. 6, devices 490 and 495 decide to transmit at the same time. Each device 490 and 495 signals independently an intention to transmit. According to the predetermined signaling schedule stored in device 490, before device 490 transmits, device 490 signals an intention to transmit in first time period and listens in a second time period. If no competing intention to transmit signal is received in the second time period, device 490 again signals an intention to transmit in a fourth and a fifth time period and listens for a competing signal in a sixth time period. If no competing signal is received in the sixth period, device 490 sends a signal in a seventh time period. Device 495 also has signals according to a predetermined schedule before transmitting. The signaling schedule of device 495 specifies that before transmitting, device 495 signals in a first and third period and listens in a second and fourth period. If no competing signal is received during the second and fourth periods, device 495 sends a signal in a fifth period. Thus in the example of FIG. 6, wherein devices 490 and 495 begin signaling simultaneously, during the first three arbitration periods, both 110 devices 490 and 495 send and receive their signals at the same time. In the fourth period, device 495 receives and detects the signal from device 490. Therefore device 495 begins receiving a message from device 490, freeing the channel for device 490 to transmit. Thus, device 495 loses the arbitration and device 490 wins the arbitration.

The channel over which a signal is transmitted may have no intrinsic significance. Nevertheless, it is advantageous to signal on multiple channels because in multi-channel signaling, transmitters are not all signaling on the same channel. Therefore, a probability of collisions and interference between signals is smaller. Specifically, in a multi-channel signaling, transmitter 350 signals intent to transmit on channel F0 and listens by means of a first associated receiver (similar to receiver 230) for a competing signal of intent to transmit on channels F1–7. Simultaneously, transmitter 460 signals a competing intent to transmit on channel F7 and listens via a second associated receiver (similar to receiver 230) for a competing signal of intent to transmit on channels F0–6. Each transmitter will receive the intent to transmit signal of the competing transmitter. A collision will be detected and can be resolved. If only one channel (for example F7) were available for signaling for both transmitters 460 and 350, then the signal of transmitter 460 would interfere with the signal of transmitter 350. Similarly, the signal of transmitter 350 would interfere with the signal of transmitter 460. When signals interfere, the collision is not detected or resolved.

Alternatively, a channel or group of channels is associated with a channel priority level and signal priority level is assigned according to the channel priority level of the group of channels over which the signal is sent. For example, the priority level associated with each channel is the channel number (0–7 for channels F0–7 respectively), and higher priority has precedence. Transmitter 350 sends an intent to transmit signal on channels F4 and F5. The signals on channels F4 and F5 are assigned signal priority levels four and five according to the channel priority levels of channels F4 and F5. Transmitter 350 listens for a signal on channels F6–F7. Simultaneously, transmitter 460 transmits an intent to transmit signal on channels F5 . F6 and listens for a signal on channel F7. The signals on channels F5 and F6 are assigned signal priority levels five and six according to the channel priority levels of channels F5 and F6. Transmitter 350 receives the intent to transmit signal of transmitter 460 on channel F6. The signal on channel F6 is assigned signal priority level six (according to the channel priority of channel F6). Signal priority level six is higher than the highest signal priority assigned to a signal of transmitter 350, five. Therefore transmitter 350 loses the arbitration and may not transmit. On the other hand, transmitter 460 does not detect a signal on channel F7. Therefore, transmitter 460 wins the arbitration and goes ahead transmitting a message. Thus the collision is resolved according to priority levels of the signals. Transmitter 460 having the highest signal priority level is given exclusive right to transmit a message.

Figure 7:
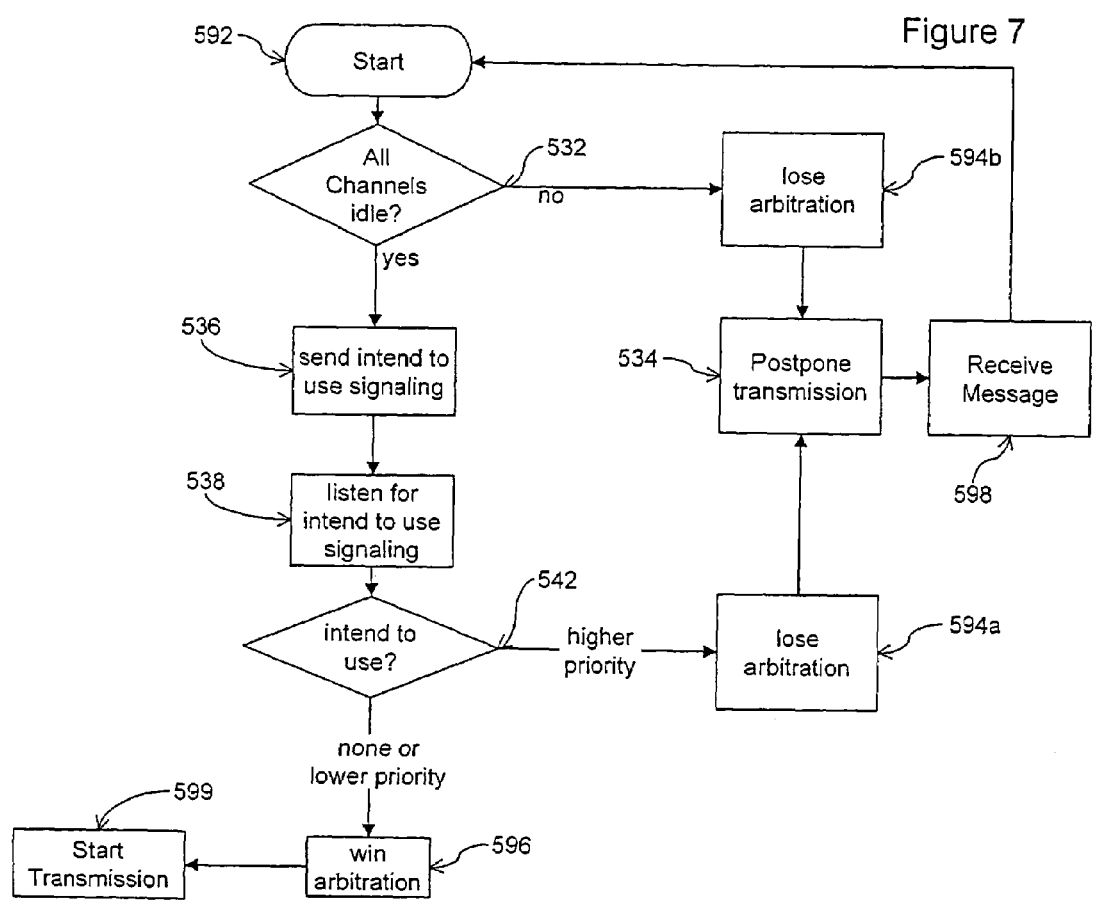
FIG. 7 is a flow chart of a method for collision resolution according to the present invention.

FIG. 7 is a flowchart of a method for collision resolution. A first transmitter 350 has to arbitrate use of a communication line with other devices (for example a second transmitter 460). The communication line is a fixed set of channels. Specifically, before transmitting a message, transmitter 350 warns other devices not transmit over any channel of the line. Transmission of a second transmitter 460 on a channel of the line during a transmission of transmitter 350 would interfere with the transmission of transmitter 350. The warning is a signal of intention to start transmission over the line. Signaling should not consume long periods of time.

A device 490 (FIG. 6) including transmitter 350 and receiver 230 requires access to a communication line. Device 490 begins 592 by first determining 532 if the line is currently idle. If the line is in use by an active transmitter, then transmitter 350 postpones 534 transmission while receiver 230 receives a message 598 from the active transmitter. When the active transmitter has finished transmitting, transmitter 350 restarts 592 the process of attempting to transmit.

When the channel is idle, transmitter 350 sends 536 an intent to transmit signal and listens 538 for a competing intent to transmit signal from another transmitter. It is understood that signaling may be over any subset of the channels pertaining to the line. The subset may be single channel or a plurality of channels. The subset may be a proper or improper subset of the set of channels making up the line. A channel may be designated for either signaling alone or data communication alone, or a channel may be used for both signaling and data communication. Where a plurality of channels is used for communication, a single transmitter may use some or all of the channels. Generally, a given device will signal on a proper subset of the set of channels making up the line, but the device will listen for signals on all of the channels.

If 542 receiver 230 does not detect a competing intent to transmit signal or receiver 230 detects a competing intent to transmit signal of a priority level lower then the priority level of the signal of transmitter 350 then receiver 230 informs transmitter 350 that transmitter 350 wins the arbitration 596. Then transmitter 350 begins to transmit arbitrary data 599. Priority of a signal may be indicated by the channel upon which the signal is transmitted. Priority may also be indicated intrinsically by the pattern of the signal. For example, suppose that there are four channels numbered one to four. All four channels are used both for signaling and data transmission. Signals on a higher numbered channel have priority over signals on a lower numbered channel. In the embodiment of FIG. 7 there are two intent to transmit signal patterns, a first pattern illustrated in FIG. 1 consists of five phase shifts in a single symbol period. The phase shifts within one symbol are −90, +90, +90, −90, +90, −90 and −90 degrees. The second symbol pattern (not shown) has three phase shifts of +90, −90, −90 equally spaced within one symbol period. Signals on a given channel having the first pattern are assigned a higher priority than signals of the second pattern on the given channel. A transmitter uses as an end transmission signal, the same signal pattern that the transmitter used at the beginning of a transmission as an intent to transmit signal. It is understood that differing signal patterns or channels may also be used differentiate between types of signals or the identity of a signaling transmitter or the identity of an intended receiver.

When 542 receiver 230 detects a competing intent to transmit signal from a competing transmitter, channel access and signaling controller 281 determines the priority of the competing signal. Priority level is according to the channel upon which the signal is transmitted and the form of the signal as stated above. If the competing signal of the competing transmitter is of higher priority than the signal of transmitter 350, then receiver 230 sends a message 285 to transmitter 350 that transmitter 350 loses the arbitration 594*a*. The competing transmitter wins arbitration 594*a* and therefore the competing transmitter transmits a message and transmitter 350 postpones transmission 534 while receiver 230 receives 598 the message from the competing transmitter. After the competing transmitter completes transmission, transmitter 350 returns to the beginning of the transmission process 592*c*.

Figure 8:
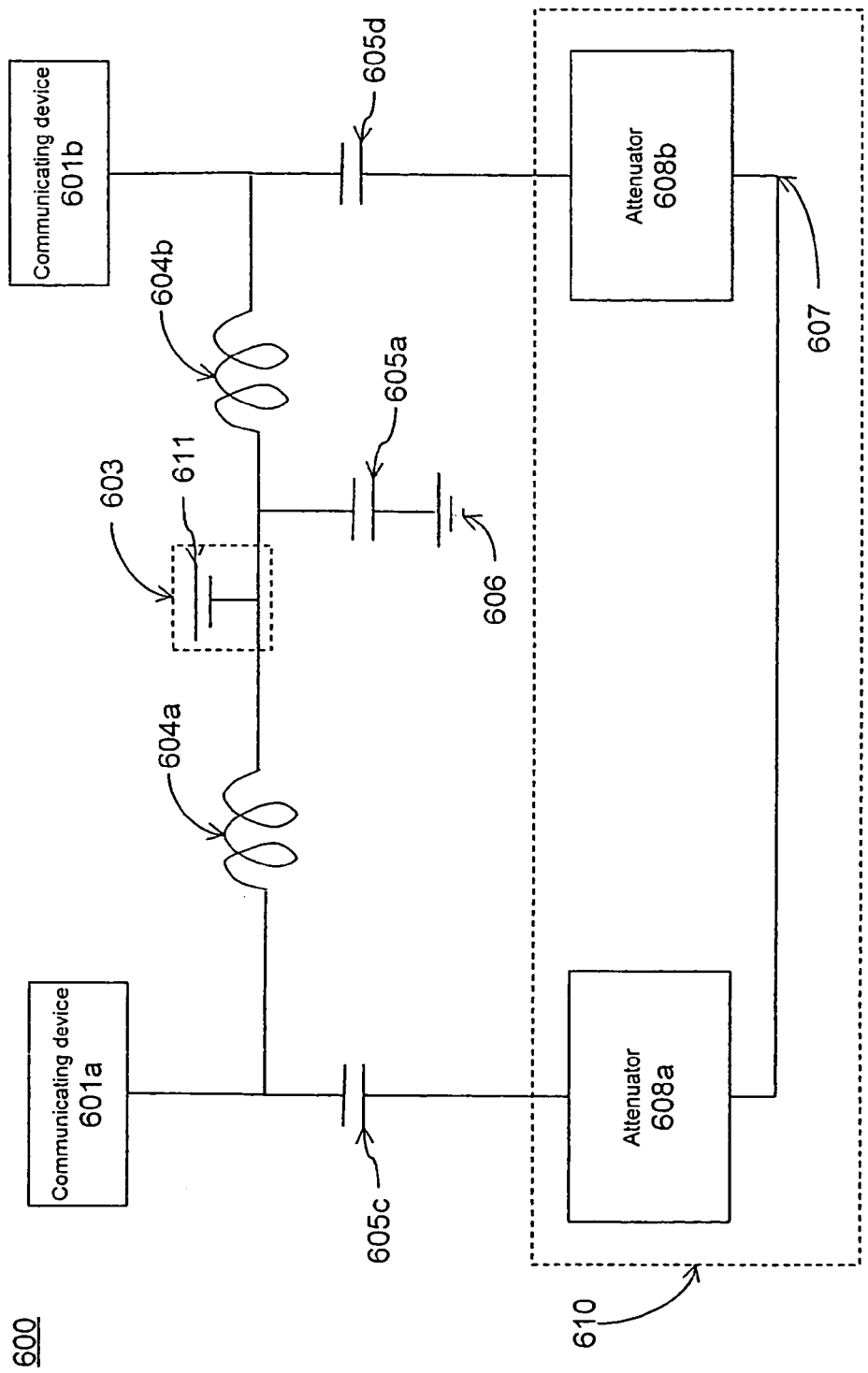
FIG. 8 is a schematic drawing of a system to test signaling and communication amongst devices according to the present invention.

FIG. 8 illustrates a system 600 for testing the signaling and data communication amongst devices on a DC power line. In system 600, two devices 601*a* and 601*b* are communicating. Calibrated attenuations between the two devices determine the communication channel quality over the DC power line.

A DC power supply 611 supplies a DC voltage to devices 601*a* and 601*b*. Inductors 604*a* and 604*b* decouple power supply 611 from voltage fluctuations due to a communication carrier (the carrier is a high frequency oscillating voltage). Power supply 611 is further decoupled from the communication carrier by capacitor 605*a*. Capacitor 605*a* nullifies the residual communication carrier voltage by shorting the carrier to ground 606.

The communication carrier is conveyed between device 601*a* and device 601*b* along a transmission medium 610. In system 600, medium 610 includes a wire 607 and two adjusters 608*a* and 608*b*. Adjusters 608*a* and 608*b* are attenuators that adjust attenuation of medium 610. Along with attenuation, alternative attributes of medium 610 that may be adjusted include but are not limited to frequency response (by a filter array), noise pattern or noise level (by a noise generator), impedance (by an inductor), and capacitance (by a capacitor). Adjustments may be made frequency dependent by a filter array (similar to 274*b*). A separate adjustor 608 is associated with each filter 275 allowing individual adjustment of an attribute of the corresponding frequency band independent of other frequency bands. Each device 601*a* and 601*b* is connected to medium 610 via a capacitor 605*b* and 605*c* respectively. Capacitors 605*b* and 605*c* prevent DC current from passing along medium 610 from device 601*a* to 601*b* and vice versa. A DC potential is passed from power supply 611 to devices 601*a* and 601*b* through the inductors 604*a* and 604*b*. Inductors 604*a* and 604*b* stop the transmission carrier from passing through power supply 611. Capacitor 605*a* shorts to ground 606 any residual carrier frequency that may pass through inductors 604*a* and 604*b*. A combination of such test fixtures can be applied to more than two devices by applying an attenuator, capacitor and inductor to each of the connected devices.

Figure 9:
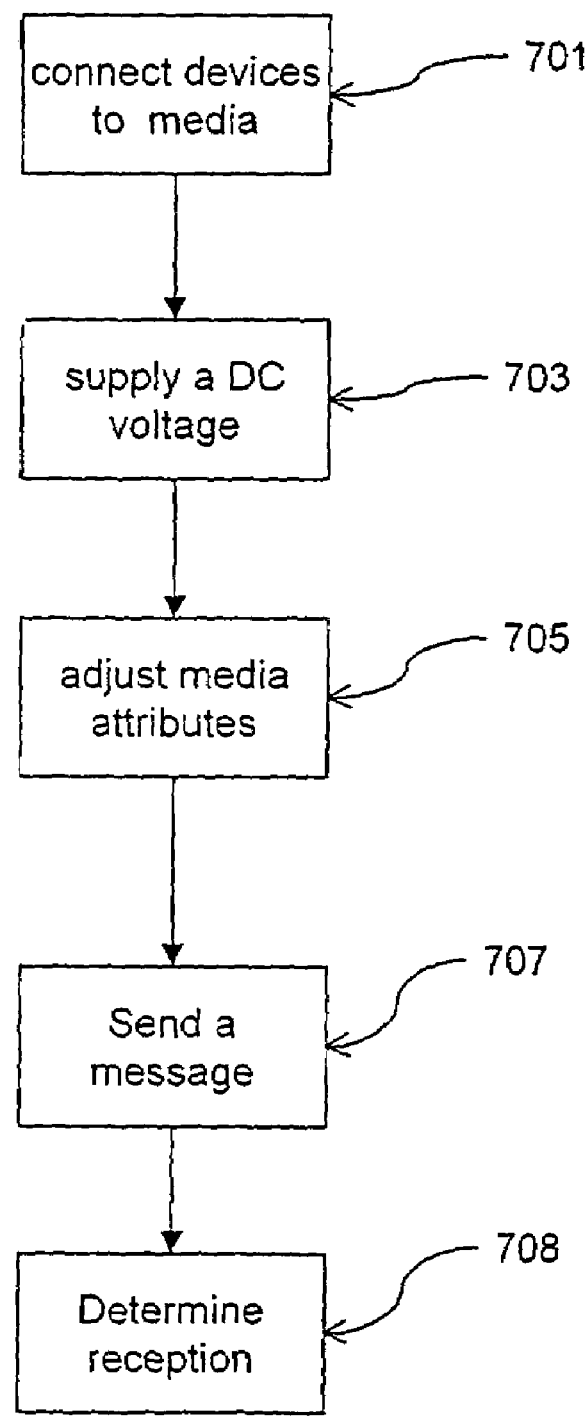
FIG. 9 is a flow chart of a method for testing a communication amongst devices according to the present invention.

FIG. 9 is a flow chart illustration of a method to test signaling and data communication amongst a plurality of devices on a DC power line under varied media conditions. A plurality of devices such as devices 601*a* and 601*b* is connected 701 to a communication media 610. In the embodiment of FIG. 9, device 601*a* is a radio combined with a signal transmitter 350 and device 601*b* is a servo used for raising an antenna combined with a signal receiver 230. Communication between devices 601*a* and 601*b* is conveyed by media 610. A power supply 611 is used to supply 703 a DC voltage to devices 601*a* and 601*b*.

Attributes of medium 610 are adjusted 705 to represent a variety of communication conditions found in the field. For example, in the embodiment of FIG. 9, devices 601*a* and 601*b* are components of a vehicle. In an automobile, devices 601*a* and 601*b* communicate by conveying signals over DC power supply lines of the automobile. The intention of the test of FIG. 9 is to test devices 601*a* and 601*b* under different conditions of voltage, noise and carrier attenuation. For example when devices 601*a* and 601*b* are installed into a small car the short length wiring in the DC power system will produce little attenuation of the communication carrier. On the other hand, electrical noise is highly variable. When devices 601*a* and 601*b* are installed in a large truck, attenuation of the communication carrier will be large because the carrier is conveyed over a long wire in the electrical power system of the truck.

In the embodiment of FIG. 9 system 600 is used to simulate the conditions of a small car. DC power supply 611 supplies 12-volt DC power to devices 601*a* and 601*b* through coils 604*a* and 604*b*. Adjusters 608*a* and 608*b* are adjusted to reduce the amplitude of the communication carrier by 10 db simulating a DC power line of six meters under certain load conditions. Adjusting media attributes 705 can also include adding noise by means of noise generator.

Once the medium is properly adjusted 705, a signal or arbitrary datum is sent 707 from device 601*a* to device 601*b*.

Specifically, turning on the radio of device 601a prompts transmitter 350 to send 707 a "raise antenna" signal to receiver 230 of device 601b. Receiver 230 relays the signal to the servo of device 601b. The response of device 601b is observed to determine 708 if the signal was received by device 601b. Specifically, if the servo of device 601b begins to function when the radio of device 601a is turned on, then communication is deemed acceptable. The highest allowable attenuation level for reliable signaling may be measured in this embodiment by increasing attenuation of adjusters 608a and 608b until device 601b fails to receive a signal from device 601a.

Alternatively, sending a message 705 may include transmitting an arbitrary message. For example, in an alternative embodiment, device 601a may include a cellular telephone and device 601b may include a computer modem. In the alternative embodiment, the message from device 601a to 601b will be arbitrary data from the Internet and determination of reception will be by viewing the received data on a monitor. The arbitrary data bit error rate can be measured as a function of attenuation.

It is emphasized that the method and system for testing communication of the present invention is also intended for more than two devices 601a and 601b. With an increased number of devices, a correspondingly increased number of adjusters permits adjusting 705 the attributes of medium 610 separately for communication between specific devices in a network of multiple devices. For example, for three devices 601a, 601b, and 601c (not shown) with three adjusters 608a, 608b, and 608c (not shown) the attenuation could be 10 db between devices 601a and 601b and the attenuation could be only 6 db between devices 601a and 601c and the attenuation could be 16 db between devices 601b and 601c.

It is also emphasized that other attributes of media 610 could be adjusted. A noise generator may add noise to line 607 to simulate channel noise. Attributes that could be adjusted include but are not limited to as capacitance, inductance, and signal to noise ratio. Furthermore different components of the carrier can be adjusted separately. For example, using a set of parallel filters the attenuation could be adjusted separately for various frequency ranges.

While the invention has been described with respect to a limited number of embodiments, it will be appreciated that many variations, modifications and other applications of the invention may be made.

It will be appreciated that the above descriptions are intended only to serve as examples, and that many other embodiments are possible within the spirit and the scope of the present invention.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A transmitter for transmitting an arbitrary datum over a channel of a communication carrier and for sending a signal over the channel comprising:
    (a) a modem for modulating the arbitrary datum according to a modulation scheme; and
    (b) a signaling shifter to modify the communication carrier according to a modification scheme;
    wherein said modification scheme further includes a pattern of modifications, and
    wherein the transmitter further comprises:
    (c) a signaling pattern generator for controlling said shifter; and wherein said modulation scheme includes modulating a symbol onto the carrier over a symbol period and said signaling pattern includes a plurality of said modifications within said symbol period.

2. The transmitter of claim 1, wherein said modulation scheme includes at least one mode selected from the group consisting of BPSK, QPSK, AM, FM, CDMA.

3. The transmitter of claim 1, wherein said modification scheme includes at least one change selected from the group consisting of shifting a phase, shifting an amplitude, and shifting a frequency.

4. The transmitter of claim 1, wherein the signal is used to communicate at least one message selected from the group consisting of an intention to transmit, an end of transmission, a congestion condition, an instruction to turn on a device, an instruction to turn off a device, a request to retransmit and dominant and recessive statuses.

5. The transmitter of claim 1, wherein the carrier is conveyed by at least one medium selected from the group consisting of a utility power line, a DC power line, a dedicated communication wire, a fiber optic cable, a radio wave, an ultra sonic wave and a magnetic field.

6. The transmitter of claim 1, wherein said modulating and said modifying are effected substantially simultaneously.

7. The transmitter of claim 1, wherein said modification scheme is altered to adjust the probability of signaling errors.

8. The transmitter of claim 1, wherein said signaling pattern generator includes at least one processor selected from the group consisting of a programmable logic array device, an application specific integrated circuit, and a digital signal processor.

9. The transmitter of claim 1, wherein said pattern is altered to adjust the usage of a channel according to communication performance.

10. A receiver for receiving an arbitrary datum from a channel of a communication carrier and for receiving a signal over the channel comprising:
    (a) a modem for demodulating the arbitrary datum, the datum having been modulated by a modulation scheme; and
    (b) a detector to detect the signal, the signal having been sent via modifications of the carrier according to a modification scheme;
    wherein said modification scheme includes a pattern of modifications to the carrier;
    wherein the receiver further comprises:
    (c) a processor for identifying said pattern;
    and wherein said modulation scheme includes modulating a symbol onto the carrier over a symbol period and said pattern includes a plurality of said modifications within said symbol period.

11. The receiver of claim 10, wherein said processor includes at least one circuit selected from the group consisting of a programmable logic array device, an application specific integrated circuit, and a digital signal processor.

12. The receiver of claim 10, wherein said processor further evaluates communication performance.

13. The receiver of claim 10, wherein a pattern identification criterion is adjusted according to communication performance.

14. The receiver of claim 10, wherein said processor further adjusts a usage of a channel for an arbitrary datum transmission according to communication performance.

15. A method of signaling during communication by a plurality of devices over a plurality of channels, comprising the steps of:
  (a) sending a first signal from a first device of the plurality of devices on a first channel of the plurality of channels, by steps including:
    (i) modulating a carrier of said first channel by a modulation scheme for transmitting an arbitrary datum, and
    (ii) modifying said carrier by a modification scheme for sending said first signal; and
  (b) listening by a second device for said signal over a subset of the plurality of channels, said subset containing said first channel and at least one other channels,
wherein said second device includes a transmitter and said listening is for the sake of collision detection;
and wherein the method further comprises the steps of:
  (c) resolving said collision; and
  (d) assigning a signal priority level to said first signal;
and wherein said resolving is according to said signal priority level.

16. The method of claim 15, further comprising the step:
  (e) detecting by said first device of a second signal over said at least one other channel.

17. The method of claim 15 wherein said first signal is of an intention to transmit over said at least one channel.

18. The method of claim 15, wherein a channel of said subset is associated with a channel priority level and said step of assigning said signal priority level is according to said channel priority level of said channel.

19. A system for testing communication amongst a plurality of devices over a medium comprising:
  (a) an adjuster to change an attribute of the medium; and
  (b) a DC power supply for supplying a DC voltage to the devices, the DC power supply being decoupled from transmissions by the devices.

20. The system of claim 19, wherein said adjuster changes at least one attribute selected from the group containing attenuation, impedance, frequency response, noise pattern, and noise level.

21. A system for communicating via a medium, comprising:
  (a) a plurality of devices for communicating via the medium, each said device including a transmitter for transmitting an arbitrary datum over a channel of a communication carrier via the medium and for sending a signal over the channel, each said transmitter including:
    (i) a modem for modulating the arbitrary datum according to a modulation scheme, and
    (ii) a signaling shifter to modify the medium according to a modification scheme; and
  (b) a testing subsystem for testing the communicating by said plurality of devices, said testing subsystem including:
    (i) an adjuster to change an attribute of the medium, and
    (ii) a DC power supply for supplying a DC voltage to the devices, the DC power supply being decoupled from transmissions by the devices.

22. A method of signaling during communication by a plurality of devices over a channel, comprising the steps of:
  (a) sending a first signal from a first device of the plurality of devices on the channel, by steps including:
    (i) modulating a carrier of the channel by a modulation scheme for transmitting an arbitrary datum, and
    (ii) modifying the carrier by a modification scheme for sending said first signal; and
  (b) listening by a second device for said signal on the channel for the sake of collision detection, said second device including a transmitter;
  (c) resolving said collision; and
  (d) assigning a signal priority level to said first signal; said resolving being according to said signal priority level.

* * * * *